(12) United States Patent
Azada et al.

(10) Patent No.: US 8,050,712 B2
(45) Date of Patent: Nov. 1, 2011

(54) METHOD OF PROVIDING A MOBILE MULTIMEDIA HUB

(75) Inventors: Maria Rg Azada, Naperville, IL (US); David S. Benco, Winfield, IL (US)

(73) Assignee: Alcatel Lucent, Paris (FR)

( * ) Notice: Subject to any disclaimer, the term of this patent is extended or adjusted under 35 U.S.C. 154(b) by 1365 days.

(21) Appl. No.: 11/541,266

(22) Filed: Sep. 29, 2006

(65) Prior Publication Data

US 2008/0081664 A1    Apr. 3, 2008

(51) Int. Cl.
*H04M 1/00* (2006.01)
*H04B 1/38* (2006.01)

(52) U.S. Cl. .............. 455/557; 455/425; 455/426.1; 455/435.2

(58) Field of Classification Search .............. 455/557, 455/425, 426.1, 435.2
See application file for complete search history.

(56) References Cited

U.S. PATENT DOCUMENTS

| | | | | |
|---|---|---|---|---|
| 5,014,267 A * | 5/1991 | Tompkins et al. | ........... | 370/259 |
| 6,091,968 A * | 7/2000 | Koohgoli et al. | ........... | 455/557 |
| 6,272,575 B1 * | 8/2001 | Rajchel | ........... | 710/301 |
| 6,952,576 B2 * | 10/2005 | Fish et al. | ........... | 455/414.1 |
| 7,068,596 B1 * | 6/2006 | Mou | ........... | 370/229 |
| 2006/0165104 A1 * | 7/2006 | Kaye | ........... | 370/401 |
| 2007/0002364 A1 * | 1/2007 | Koehler et al. | ........... | 358/1.15 |
| 2007/0014253 A1 * | 1/2007 | Lee et al. | ........... | 370/315 |
| 2008/0207202 A1 * | 8/2008 | Zellner et al. | ........... | 455/435.1 |

OTHER PUBLICATIONS

John Markoff and Laura M. Holson; Apple Plans to Inhabit Living Room; New York Times, nytimes.com; Sep. 13, 2006; 4 pages; New York Times Co.; New York, NY; USA.

Wililams, Stephen; Music From Your iPhone Straight to the Speakers, Wirelessly; New York Times Newspaper; Aug. 4, 2010; New York Times Newspaper, NY; USA.

* cited by examiner

*Primary Examiner* — Tuan H Nguyen
(74) *Attorney, Agent, or Firm* — Carmen Patti Law Group, LLC

(57) ABSTRACT

A method is provided for expanding the input and output capabilities of a mobile communications device. If a received signal should be immediately outputted, then a user of the mobile communications device selects an open interface output port for the received signal prior to receiving the signal. Upon reception, the received signal may be transmitted via the open-interface output port on the mobile communications device to an external device. If the received signal may be outputted at another time, then the user of the mobile communications device selects the open interface output port before or after receiving the signal. Upon reception, the signal may be stored as one or more files on the mobile communications device. At another time, the user may use the mobile communications device to transmit, via the open interface output port, a second signal having the one or more files to the external device.

35 Claims, 3 Drawing Sheets

SELECT DESTINATION FOR RECEIVED SIGNAL     310

[X] OUTPUT    [ ] STORE    [ ] MOBILE TELEPHONE DISPLAY

SELECT OPEN INTERFACE OUTPUT PORT TYPE     320

[X]  USB

[ ]  S-VIDEO

[ ]  WI-FI

[ ]  BLUETOOTH

[ ]  FIREWIRE

[ ]  INFRA-RED

FIG. 3

METHOD OF PROVIDING A MOBILE MULTIMEDIA HUB

TECHNICAL FIELD

This invention relates to the art of hand-held mobile devices, and more particularly to expanding the input and output capabilities of hand-held mobile devices to support a mobile multimedia hub.

BACKGROUND

Wireless communication has grown rapidly during the past several years due to new applications that utilize new wireless network capabilities. Today, many mobile phones are capable of a) receiving and allowing users to hear voice, b) receiving and displaying text messages, c) browsing the Internet, and d) storing ring tones and video clips, which may have been downloaded as favorites. In addition to these features, more advanced mobile phones are capable of a) capturing, storing, and displaying images, b) video capture with sound and playback, c) downloading, storing, and playing back music, and d) allowing users to play games.

Disadvantageously, the user interface on a mobile phone is very small. Illustratively, a visual display of the mobile phone is typically in the range of two to three inches wide. Also, a key pad used for inputting numbers in the mobile phone is only a few inches long. A directional control used to browse a menu is small. Furthermore, speakers on the mobile phone are small, which limits sound volume and sound quality. These user interface size limitations prevent mobile phone users from viewing, listening, and enjoying displayed images, video with sound, and games similarly as one could when watching a larger screen, e.g., 21 inch television screen, or listening to a larger sound system.

Also disadvantageously, the available user memory capacity on a mobile phone is small, e.g., 5 MB. This memory limitation prevents mobile phone users from downloading large files, e.g., broadband files. Further disadvantageously, mobile phones have proprietary interfaces, which prevent mobile phone users from extracting a received signal for external applications.

SUMMARY

It has been recognized, in accordance with the principles of the invention, that the problems of the prior art can be overcome by a mobile multimedia hub. More specifically, the mobile multimedia hub assists users of mobile phones in overcoming the input and output limitations of mobile phones to support higher quality, higher performance viewing and listening by a) receiving, via wireless communication, a first signal with a mobile communications device, and b) transmitting, via an open interface output port on the mobile communications device, a second signal from the mobile communications device to an external device, c) wherein a user of the mobile communications device employs the mobile communications device to specify the open interface output port for the second signal.

DESCRIPTION OF THE DRAWINGS

FIG. 3 shows an illustrative view of menu screens for the present invention of the Mobile Multimedia Hub.

DETAILED DESCRIPTION

The present invention provides an open-interface communications mobile communications device handset with new functionality, i.e., a Mobile Multimedia Hub.

Figure 1:
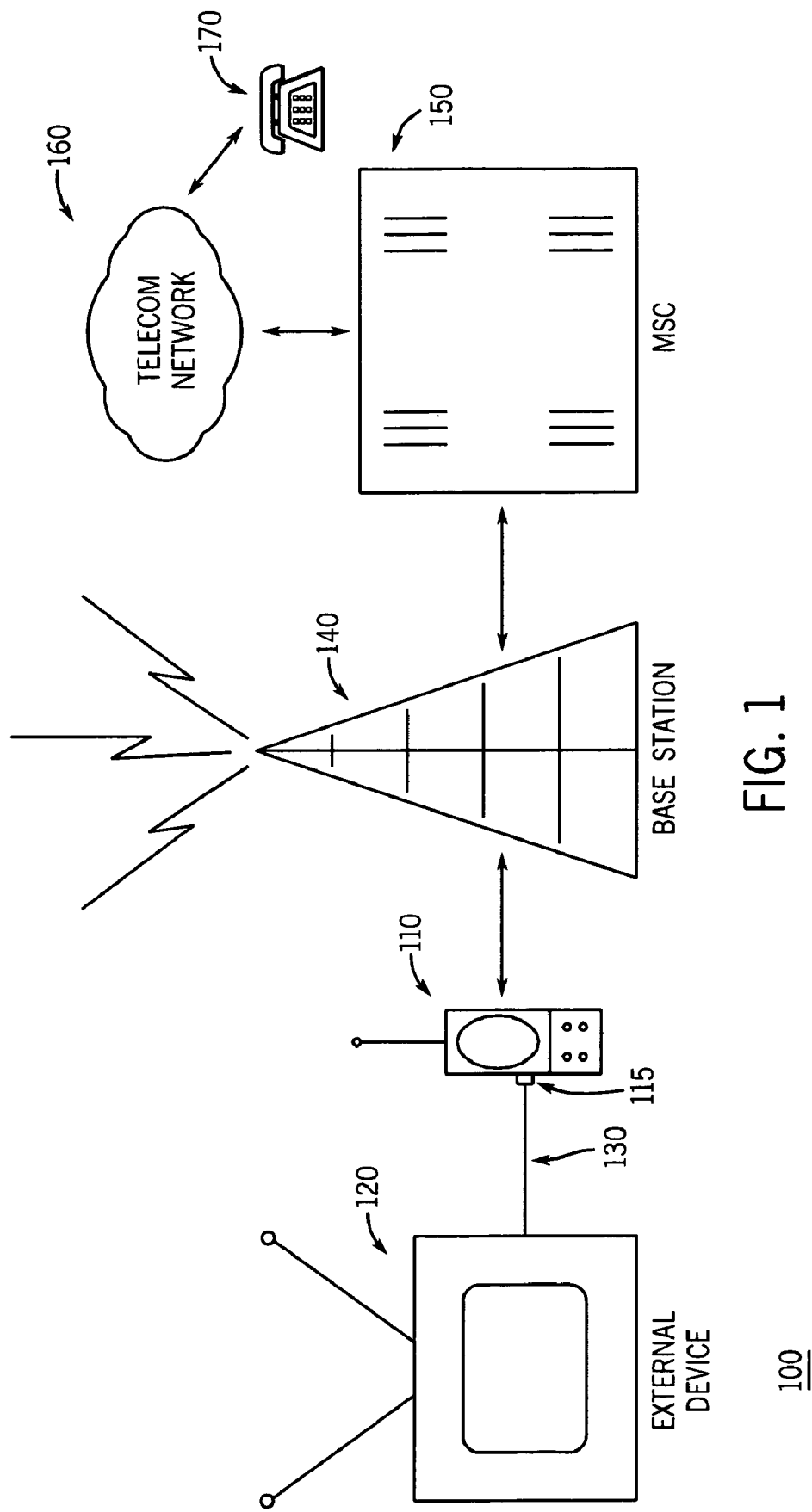
FIG. 1 shows an illustrative view of a Mobile Multimedia Hub arranged in accordance with the principles of the invention.

FIG. 1 is a diagram illustrating the Mobile Multimedia Hub arranged in accordance with the principles of the invention. As shown in FIG. 1, Mobile Multimedia Hub 100 includes mobile telephone 110 having open interface output port 115 which is connected to physical interface 130 which is connected to external device 120. Also, FIG. 1 shows base station 140, which connects mobile telephone 110 to mobile switching center (MSC) 150. MSC 150 is connected to telecom network 160 which is connected to caller 170.

Mobile telephone 110 is a mobile communications device capable of wirelessly connecting to a communications network, e.g., telecom network 160, via a telephone switching network having wireless technologies that may include one or more mobile base stations, e.g., base station 140, connected to one or more mobile switches, e.g., mobile switching center (MSC) 150, allowing a user of mobile device 110 to communicate with a caller, e.g., caller 170. Mobile telephone 110 may be operated in a given geographical area which may be a visiting area by which a subscriber roams into or the subscriber's home service area. Mobile telephone 110 is capable of sending and receiving voice calls, email, short message service (SMS), microbrowser messages or text messaging, sending and receiving high speed data, e.g., 480 Mbit/sec to 800 Mbit/sec, and high bandwidth video signals, e.g., at least 800 Mbit/sec.

Mobile telephone 110 may use an air interface standard such as Code Division Multiple Access (CDMA), Time Division Multiple Access (TDMA), Universal Mobile Telecommunications System (UMTS), Global System for Mobile Communications (GSM), etc., not shown, or any other standard or protocol which supports voice calls, email, SMS, microbrowser messages or text messaging. Also, mobile telephone 110 may have open interface output ports, e.g., open interface output port 115, which is a new capability for mobile phones. Illustratively, mobile telephone 110 may have one or more open interface output ports such as a) a short range wireless interface standard, e.g., Bluetooth, b) a high speed wireless data interface for accessing the Internet, e.g., Wi-Fi based on IEEE 802.11, c) a high speed wire-line data interface, e.g., FireWire, d) a high speed wire-line video and voice interface, e.g., Separate Video (S-Video) port, e) a high speed Internet web browsing interface, e.g., Universal Serial Bus (USB) port, and/or f) an infra red port. Mobile telephone 110 may be capable of multi-band operation, i.e., two radio access technologies.

Mobile telephone 110 may be capable of allowing the user to specify and control which type of input should be connected to a particular output port. In one embodiment of the invention, mobile telephone 110 may have a menu screen that allows the user to a) dynamically direct a received data stream or video stream to an external device via open interface output port 115, b) store the received data stream or video stream in a file, or c) direct the received data stream or video stream to the visual display of mobile telephone 110. Illustratively, a real-time video feed, e.g., sports updates, news, etc., may be temporarily outputted to open interface output port 115, e.g., the USB port or the S-Video port, for display on an external device, instead of outputting the video feed to the small visual display of mobile telephone 110. In another embodiment of the invention, the user of mobile telephone 110 may be able to use a directional control of mobile telephone 110 to select, i.e., to point and click, a stored video file and transmit the video to the external device via open interface output port 115.

Mobile telephone 110 is capable of storing received data streams or video streams, e.g., non real-time video, as downloaded files, which may be transmitted to the external device at another time. The files may be stored in a format of the received files, e.g., a ".ppt" file extension for PowerPoint files. In one embodiment of the invention, mobile telephone 110 may have several gigabytes of flash memory for internal storage, as will be appreciated by those of ordinary skill in the art. In an alternative embodiment of the invention, mobile telephone 110 may have several gigabytes of removable storage, e.g., memory sticks used for camera phones, USB flash drives, etc.

Mobile telephone 110 may have a set of menu screens provided via an open application programming interface (API) that allows the user to browse the stored contents of mobile telephone 110 to locate and extract files stored from the high speed data and high bandwidth video/audio signals received by mobile telephone 110. In one embodiment of the invention, the open application programming interface may be a text-based directory lister such as a "ls" command in UNIX or Linux, or a "dir" command in DOS. In another embodiment of the invention, the open application programming interface may be a graphical user interface (GUI)-based hierarchical file system display such as Windows Explorer. The user of mobile telephone 110 may browse the stored contents of mobile telephone 110 and select files a) via a touch screen, b) by pressing keys on a handset of mobile telephone 110 or, c) via a voice response if mobile telephone 110 has speech recognition capabilities.

Mobile telephone 110 may be capable of allowing the user to manage interfaces connected to mobile telephone 110. Illustratively, mobile telephone 110 may recognize external devices, e.g., external keypads, external speakers, etc., connected to mobile telephone 110. Also, mobile telephone 110 may allow the user to decide whether to use mobile telephone 110's visual display or the Mobile Multimedia Hub 100 to display received information. Furthermore, mobile telephone 110 may be capable of managing $3^{rd}$ party software, e.g., spreadsheets, photo editors, etc., added to mobile telephone 110.

In one embodiment of the invention, mobile telephone 110's software interface, i.e., the menu screens, may be implemented as an add-in application on mobile telephone 110 and operate in conjunction with existing programs resident on the mobile telephone 110. In an alternative embodiment of the invention, the software interface may be implemented as an enhancement to an existing application on mobile telephone 110. In yet another embodiment of the invention, the software interface may be implemented as a replacement for an existing application on mobile telephone 110.

In one embodiment of the invention, mobile telephone 110 may be implemented as a small, light-weight portable mobile telephone, e.g., pocket telephone. In another embodiment of the invention, mobile telephone 110 may be implemented as a mobile telephone installed in an engine-driven vehicle and supplied with current from the vehicle electrical system. In an alternative embodiment of the invention, mobile telephone 110 may be implemented as a personal digital assistance (PDA) device, a two-way pager, a wireless portable media player that allows an addition of executable programs, or other suitable wireless communications devices other than a laptop computer.

External device 120 is a device capable of displaying received information, e.g., data or video signals, and outputting audio. External device 120 may have a) a monitor for viewing the received information, b) ports, e.g., USB port, infra red port, etc., for receiving the information from other sources, c) an input device, e.g., key board, Braille pad, joystick, mouse, scanner, etc., for modifying and manipulating displayed data, and d) internal or external storage capacity. Also, external device 120 may have an audio input device, e.g., a microphone, for recording audio and audio output devices, e.g., speakers, for users to listen to audio.

In one embodiment of the invention, external device 120 may be implemented as a television with peripheral devices, e.g., a keyboard, a Braille pad, a microphone, a joystick, etc. In another embodiment of the invention, external device 120 may be implemented as a computer with peripheral devices, e.g., a scanner. In yet another embodiment of the invention, external device 120 may be implemented as a stereo system, an automobile sound system, or a home entertainment system.

Physical interface 130 provides an open interface for sharing information between mobile telephone 110 and external device 120. Illustratively, physical interface 130 may be implemented as a) an open interface media connector, e.g., a USB cable with USB connectors attached to both ends of the cable or b) an antenna on mobile telephone 110 and external device 120 for transmitting and receiving short range wireless signals or high speed wireless data signals between mobile telephone 110 and external device 120.

When mobile telephone 110 is connected to external device 120 via physical interface 130 to establish the Mobile Multimedia Hub 100, the user of mobile telephone 110 may transmit a received high speed data signal or a received high bandwidth video/audio signal from mobile telephone 110 to external device 120. Illustratively, if a received signal, e.g., a real-time video signal, should be outputted immediately to an external device for viewing, then prior to receiving the signal, the user may use a menu screen in mobile telephone 110 to assign open interface output port 115, e.g., a S-Video port, for the signal instead of a default use of mobile telephone 110's visual display. Upon receiving the signal, mobile telephone 110 immediately transmits the signal through open interface output port 115 and physical interface 130 to an external device, e.g., a high definition television, in a home, an office, a hotel room, or a vehicle, etc., for immediate viewing and listening. Also, the external device may store the received signal.

If the received signal, e.g., a data stream carrying a PowerPoint presentation, may be outputted at another time, then the user of mobile telephone 110 may select the output port of mobile telephone 110 for transmitting the received signal before or after receiving the signal. Illustratively, upon reception, the signal may be stored as one or more files on mobile telephone 110. At another time, the user may use a) a first menu screen to browse mobile telephone 110 for the stored PowerPoint presentation, and b) a second menu screen in mobile telephone 110 to assign open interface output port 115 for the stored PowerPoint presentation and to transmit the stored PowerPoint presentation through open interface output port 115 and physical interface 130 to the external device, e.g., a desktop computer, in a hotel room for viewing leisurely. Again, the external device may store the received signal.

Those of ordinary skill in the art will readily be able to select mobile telephones, physical interfaces, and external devices appropriate for use in any particular implementation of the Mobile Multimedia Hub 100.

Advantageously, mobile telephones may be used as small, light weight storage devices for large received files. The files may be extracted, viewed and modified on a larger external device at the convenience of the user. Also advantageously, upon viewing, storing and modifying the files on the larger external device, the user may transmit the files from the external device to the mobile telephone and store them until needed, or the user may send the modified files from the mobile telephone to another destination, e.g., a web site. Further advantageously, the addition of the open interface output ports to mobile telephones provides the capability of a higher quality of viewing and listening for users.

Figure 2:
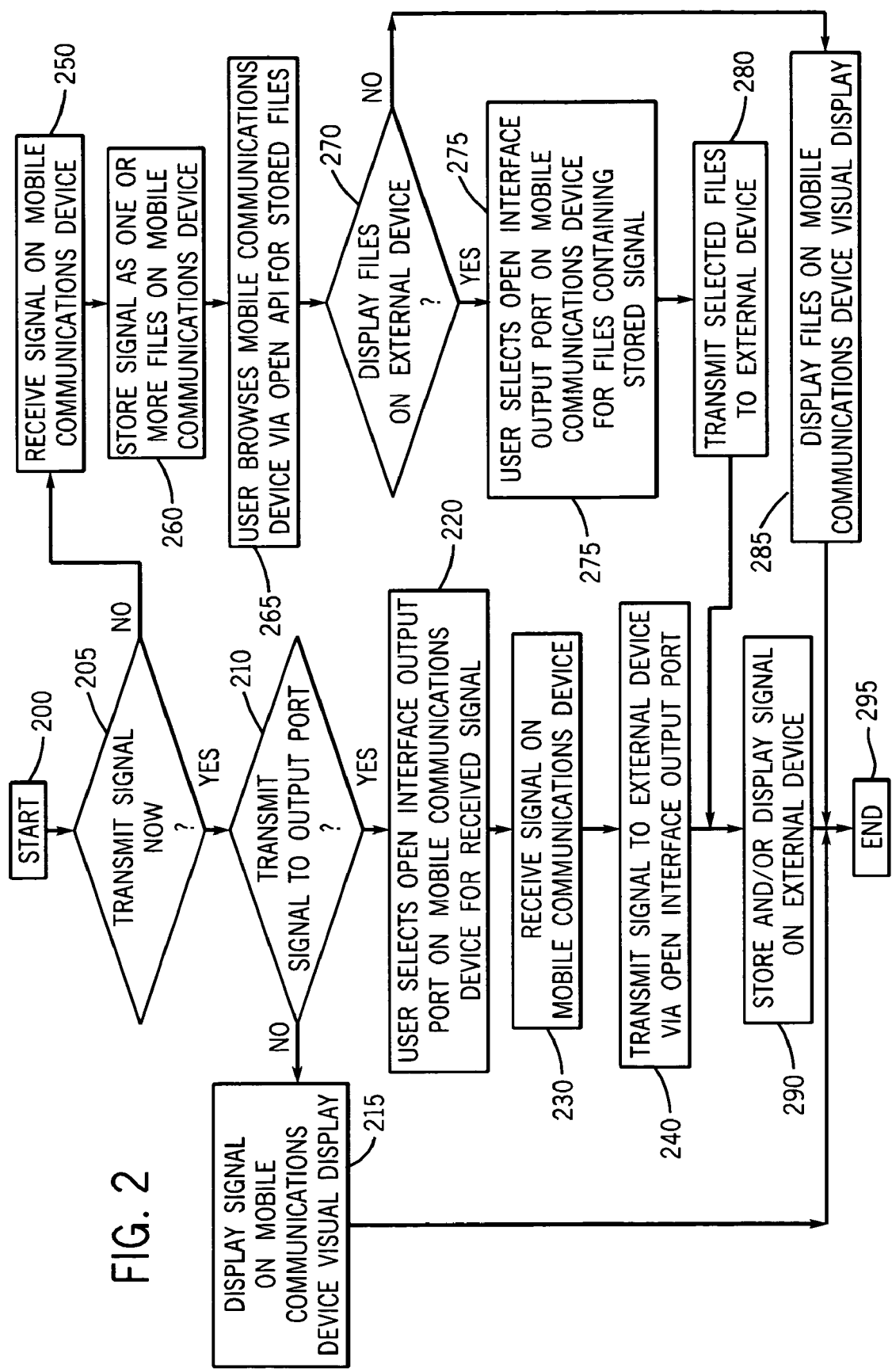
FIG. 2 shows an illustrative flow chart for a method of operating the Mobile Multimedia Hub in accordance with the principles of the invention.

FIG. 2 shows a flow chart of the operation of the Mobile Multimedia Hub 100 in accordance with the principles of the present invention. The process is entered in step 200.

In step 205 (FIG. 2), it is necessary to determine whether a signal which will be received by a mobile communications device, e.g., mobile telephone 110 (FIG. 1), should be outputted immediately or stored and outputted at another time. Illustratively, in FIG. 3, Select Destination For Received Signal 310 is a menu screen that allows the user to a) dynamically direct the signal, e.g., a data stream or video stream, to an external device via open interface output port, b) store the received signal in a file, or c) direct the received signal to the visual display of mobile telephone 110. In this context, "select" means choosing an item from a menu or inputting information on a screen such that a processor, not shown, running the software in mobile telephone 110 may react to the instruction. The processor comprises a non-transitory computer-readable medium.

If the test result in conditional branch point 205 (FIG. 2) is NO, indicating that the signal should be stored, then control is passed to step 250.

In step 250 (FIG. 2), mobile telephone 110 (FIG. 1) receives the signal.

In step 260 (FIG. 2), mobile telephone 110 (FIG. 1) stores the received signal as one or more files. Mobile telephone 110 may have several gigabyte of flash memory for internal storage or mobile telephone 110 may have may have several gigabyte of removable storage.

In step 265 (FIG. 2), the user of mobile telephone 110 browses a local file system on mobile telephone 110 (FIG. 1) using an open application programming interface to locate and select the one or more files. The user may browse the stored contents and select the files a) via a touch screen, b) by pressing keys on a handset of mobile telephone 110 or, c) via a voice response if mobile telephone 110 has speech recognition capabilities.

In step 270 (FIG. 2), it is necessary to determine whether the stored one or more files should be displayed on an external device, e.g., external device 120 (FIG. 1).

If the test result in conditional branch point 270 (FIG. 2) is NO, indicating that the stored one or more files should be displayed on mobile telephone 110's visual display (FIG. 1), then control is passed to step 285.

In step 285 (FIG. 2), the one or more files are displayed on mobile telephone 110's visual display (FIG. 1). Then control is passed to step 295 (FIG. 2).

If the test result in conditional branch point 270 (FIG. 2) is YES, indicating that the stored one or more files should be displayed on external device 120 (FIG. 1), then control is passed to step 275.

In step 275 (FIG. 2), the user selects an open interface output port (FIG. 3, Select Open Interface Output Port Type 320), e.g., USB port, S-Video port, infra red port, etc., on mobile telephone 110 (FIG. 1) for outputting the stored one or more files.

In step 280 (FIG. 2), mobile telephone 110 (FIG. 1) transmits the one or more files as a signal to external device 120 via the open interface output port, e.g., open interface output port 115, and a physical interface, e.g., physical interface 130, connection to the external device. Then control is passed to step 290 (FIG. 2).

If the test result in conditional branch point 205 (FIG. 2) is YES, indicating that the signal should be transmitted immediately, then control is passed to step 210.

In step 210 (FIG. 2), it is necessary to determine whether the signal which will be received by mobile telephone 110 (FIG. 1), should be directed to the open interface output port or directed to mobile telephone 110's visual display.

If the test result in conditional branch point 210 (FIG. 2) is NO, indicating that the signal should be directed to mobile telephone 110's visual display (FIG. 1), then control is passed to step 215.

In step 215 (FIG. 2), the signal is displayed on mobile telephone 110's visual display (FIG. 1). Then control is passed to step 295 (FIG. 2).

If the test result in conditional branch point 210 (FIG. 2) is YES, indicating that the signal should be directed to the open interface output port (FIG. 1), then control is passed to step 220.

In step 220 (FIG. 2), the user employs mobile telephone 110 (FIG. 1) to select an open interface output port (FIG. 3, Select Open Interface Output Port Type 320), e.g., USB port, S-Video port, infra red port, etc., on mobile telephone 110 (FIG. 1).

In step 230 (FIG. 2), mobile telephone 110 (FIG. 1) receives the signal.

In step 240 (FIG. 2), mobile telephone 110 (FIG. 1) transmits the signal to external device 120 via the open interface output port, e.g., open interface output port 115, and a physical interface, e.g., physical interface 130, connection to the external device.

In step 290 (FIG. 2), after receiving the transmitted signal, external device 120 (FIG. 1) may display the signal and/or store the signal for future use by the user.

The process is exited in step 295.

The foregoing merely illustrates the embodiments of the invention. It will thus be appreciated that those skilled in the art will be able to devise various arrangements, which, although not explicitly described or shown herein, embody the principles of the invention, and are included within its spirit and scope.

What is claimed:

1. A method, comprising the steps of: receiving, via wireless communication, a first signal with a mobile communications device; and transmitting, via an open interface output port on the mobile communications device, a second signal from the mobile communications device to an external device; wherein the mobile communications device comprises means enabling a user of the mobile communications device to select the open interface output port from wireless and wire-line open interface output ports on the mobile communications device, and wherein the mobile communications device comprises means enabling the user to select the open interface output port for the second signal prior to the receiving step.

2. The method of claim 1 wherein the first signal and the second signal are the same.

3. The method of claim 2 wherein the first signal and the second signal are real-time video signals.

4. The method of claim 1 further comprising the step of storing, upon reception, the first signal in one or more files.

5. The method of claim 4 further comprising the step of storing the one or more files in removable storage.

6. The method of claim 4 wherein the mobile communications device comprises means enabling the user to browse a local file system on the mobile communications device to locate and select the one or more files, and wherein the one or more files are transmitted as the second signal.

7. The method of claim 6 wherein the means enabling the user to browse the local file system comprises an open application programming interface (API).

8. The method of claim 7 wherein the open application programming interface comprises a text-based directory lister or a graphical user interface (GUI)-based system.

9. The method of claim 6 wherein the mobile communications device comprises means enabling the user to select the one or more files from the group consisting of speech recognition, a touch screen, and a handset with keys for pressing.

10. The method of claim 4 wherein the first signal comprises a downloaded video.

11. The method of claim 4 wherein the first signal comprises a downloaded data file, and wherein the user selects the open interface output port after storing the received signal.

12. The method of claim 4 wherein the mobile communications device comprises means enabling the user to select the open interface output port before or after the receiving step.

13. The method of claim 4 wherein the first signal comprises one or more downloaded files, and wherein the one or more downloaded files are stored in their received formats.

14. The method of claim 1 wherein the open interface output port is selected from the group consisting of a) a Wi-Fi interface, b) a Bluetooth interface, c) a FireWire interface, d) a Universal Serial Bus (USB) port, e) a Separate Video (S-Video) port, and f) an infra red port.

15. The method of claim 1 further comprising the step of displaying the second signal on the external device.

16. The method of claim 1 further comprising the step of storing the second signal on the external device.

17. The method of claim 1 wherein the mobile communications device is selected from the group consisting of a) a mobile telephone, b) a personal digital assistance (PDA) device, c) a two-way pager, and d) a wireless portable media player.

18. The method of claim 1 wherein the first signal comprises an audio signal, a data stream or a video stream, and wherein the video stream has a bandwidth of at least 800 Mbits/sec.

19. The method of claim 18 wherein the data stream has a bandwidth of 480 Mbits/sec to 800 Mbits/sec.

20. The method of claim 1 further comprising the step of receiving, via the mobile communications device, a modified version of the second signal sent from the external device.

21. The method of claim 1 wherein the mobile communications device is configured to recognize when a connection to the external device exists.

22. A method for operating a mobile communications device to display a received signal or a stored video on an external device, the method comprising the steps of: receiving an input from a user, via one or more menu screens, to direct the received signal or the stored video to an open interface output port selected by the user from wireless and wire-line open interface output ports on the mobile communications device, wherein the mobile communications device comprises at least one menu screen that enables the user to select the open interface output port for the received signal prior to reception of the received signal; transmitting the received signal or the stored video to the external device; and displaying the received signal or the stored video on the external device.

23. The method of claim 22 further comprising the step of storing the received signal or the stored video on the external device.

24. The method of claim 22 wherein the received signal comprises a real-time video signal.

25. The method of claim 22 wherein the received signal comprises a data signal, and wherein the mobile communications device comprises means enabling the user to select the open interface output port after the received signal has been stored on the mobile communications device as one or more files.

26. The method of claim 22 wherein the mobile communications device is selected from the group consisting of a) a mobile telephone, b) a personal digital assistance (PDA) device, c) a two-way pager, and d) a wireless portable media player.

27. The method of claim 22 wherein the open interface output port is selected from the group consisting of a) a Wi-FI interface, b) a Bluetooth interface, c) a FireWire interface, d) a USB port, e) a S-Video port, and f) an infra red port.

28. A mobile communications device, comprising: means for directing signals to one or more destinations on the mobile communications device, at least one of the one or more destinations being an output port selected by a user from wireless and wire-line open interface output ports on the mobile communications device, wherein the mobile communications device comprises means enabling the user to select the output port for the signals prior to receiving the signals.

29. The mobile communications device of claim 28 wherein the means for directing is configured to react to an instruction from the user to a) send the signals when received to the output port, b) store the signals when received or c) provide the signals when received to a visual display of the mobile communications device.

30. The mobile communications device of claim 29 wherein the means for directing is configured to send stored files to the output port.

31. The mobile communications device of claim 28 wherein the output port is selected from the group consisting of a) a Wi-Fi interface, b) a Bluetooth interface, c) a FireWire interface, d) a Universal Serial Bus (USB) port, e) a Separate Video (S-Video) port, and f) an infra red port.

32. The mobile communications device of claim 28 wherein the mobile communications device is selected from the group consisting of a) a mobile telephone, b) a personal digital assistance (PDA) device, c) a two-way pager, and d) a wireless portable media player.

33. A non-transitory computer-readable medium having computer executable instructions for performing steps, comprising: means for enabling a user to select an open interface output port from wireless and wire-line open interface output ports on a mobile communications device to direct a received signal or a stored video to a device external to the mobile communications device, wherein the mobile communications device comprises means enabling the user to select the open interface output port for the received signal prior to reception of the received signal.

34. A method for operating a mobile communications device, comprising the step of: displaying one or more menu screens that enable a user to select a) a destination for a received signal and b) an open interface output port from wireless and wire-line open interface output ports on the mobile communications device to direct the received signal or a stored video to a device external to the mobile communications device; wherein the mobile communications device comprises at least one menu screen that enables the user to select the open interface output port for the received signal prior to reception of the received signal.

35. A mobile communications device comprising: one or more wireless and wire-line open interface output ports; and means enabling a user of the mobile communications device to direct a received real-time signal or a stored video to an external device via at least one of the one or more wireless and wire-line open interface output ports, wherein the mobile communications device comprises means enabling the user to select the at least one of the one or more wireless and wire-line open interface output ports for the received real-time signal prior to reception of the received real-time signal; and wherein the one or more wireless and wire-line open interface output ports comprise a Wi-Fi interface and a Universal Serial Bus (USB) port.

\* \* \* \* \*